(12) United States Patent
Kawai et al.

(10) Patent No.: US 10,534,347 B2
(45) Date of Patent: Jan. 14, 2020

(54) CONTROL DEVICE FOR MACHINE TOOL

(71) Applicant: MAKINO MILLING MACHINE CO., LTD., Tokyo (JP)

(72) Inventors: Rie Kawai, Aiko-gun (JP); Hideki Heishi, Aiko-gun (JP); Kenichi Ono, Aiko-gun (JP); Yoshihiro Hoshino, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 358 days.

(21) Appl. No.: 15/509,744

(22) PCT Filed: Sep. 30, 2014

(86) PCT No.: PCT/JP2014/076223
§ 371 (c)(1),
(2) Date: Mar. 8, 2017

(87) PCT Pub. No.: WO2016/051545
PCT Pub. Date: Apr. 7, 2016

(65) Prior Publication Data
US 2017/0285614 A1 Oct. 5, 2017

(51) Int. Cl.
*G06F 19/00* (2018.01)
*G05B 19/409* (2006.01)

(52) U.S. Cl.
CPC .. *G05B 19/409* (2013.01); *G05B 2219/32128* (2013.01); *G05B 2219/36497* (2013.01)

(58) Field of Classification Search
CPC .. G05B 19/401; G05B 19/404; G05B 19/409; G05B 19/4069; G05B 2219/36497

(Continued)

(56) References Cited

U.S. PATENT DOCUMENTS 4,794,514 A * 12/1988 Hideaki ........... G05B 19/40937
318/568.1
6,243,619 B1 * 6/2001 Inamasu ............... G05B 19/409
700/172

(Continued)

FOREIGN PATENT DOCUMENTS

JP S62-154506 10/1987
JP S63-139606 9/1988

(Continued)

OTHER PUBLICATIONS

Kuniharu, Yamato, Numerical Controller for Machine Tool, Mar. 3, 2000, Espacenet JP 2000066711 A (Year: 2000).*

(Continued)

*Primary Examiner* — Mohammad Ali
*Assistant Examiner* — Sheela Rao
(74) *Attorney, Agent, or Firm* — Morrison & Foerster LLP

(57) ABSTRACT

In order to facilitate reuse of an NC program for operation that has been executed in the past, this control device for a machine tool that drives the machine tool by executing an NC program is provided with: a first program storage unit that identifies an NC program for machining using a program name or program number and stores said program; a second program storage unit that stores an NC program for operation each time an operator executes an NC program for operation that is input manually; and a display unit that lists a plurality of NC programs for operation stored in the second program storage unit and displays said programs.

4 Claims, 5 Drawing Sheets

(58) Field of Classification Search
USPC .................. 700/159, 180, 160, 173, 192
See application file for complete search history.

(56) References Cited

U.S. PATENT DOCUMENTS

2010/0296888 A1* 11/2010 Katoh .................... B23Q 1/015
  409/131
2014/0163711 A1*  6/2014 Matsubara .............. G06K 9/00
  700/103

FOREIGN PATENT DOCUMENTS

| | | |
|---|---|---|
| JP | H3-93911 | 9/1991 |
| JP | 4-319704 | 11/1992 |
| JP | 2000-66711 | 3/2000 |

OTHER PUBLICATIONS

International Search Report and Written Opinion dated Dec. 22, 2014, directed towards PCT Application No. PCT/JP2014/076223; 12 pages.

* cited by examiner

CONTROL DEVICE FOR MACHINE TOOL

CROSS-REFERENCE TO RELATED APPLICATIONS

This application is a U.S. National Stage patent application of International Patent Application No. PCT/JP2014/076223, filed Sep. 30, 2014, which is hereby incorporated by reference in the present disclosure in its entirety.

FIELD OF THE INVENTION

The present invention relates to a control apparatus for a machine tool for driving the machine tool by executing an NC program.

BACKGROUND OF THE INVENTION

In a control apparatus for a machine tool, an automatic operation mode and an MDI (manual data input, Manual Data Input) mode are set. In the automatic operation mode, an NC program is stored in association with a program number or a program name. When an operator specifies a program number, a machine tool is automatically operated on the basis of a corresponding NC program. In the MDI mode, an NC program is not stored, and the operator each time inputs the program statement of an NC program character by character while performing execution. In the MDI mode, the input NC program is deleted when it is once executed or the MDI mode is shifted to a different mode. In the present application, an NC program stored in the automatic operation mode is called a machining NC program and an NC program input in the MDI mode is called an operation NC program (MDI program).

Patent Literature 1 discloses a numerical control device that is capable of adding a predetermined program number and storing one MDI program, which is being edited, as a backup program in an NC program memory, and resuming editing of the one MDI program by producing a copy from the NC program memory to an MDI program memory.

CITATION LIST

Patent literature 1: Japanese Unexamined Utility Model Publication No. 3-93911

SUMMARY OF THE INVENTION

When an operation NC program is manually input and executed, in some cases, the same operation NC program is executed again at a later date. When the same machining as the previous machining is performed, by making setup operations of the present machining the same as setup operations of the previous machining, the same machining as the previously executed machining can be performed. However, in the conventional technique, the operation NC program input in the MDI mode has been deleted from the control device for a machine tool upon previous execution. The operator needs to input an operation NC program again. When the operator does not save the record of the operation NC program by some kinds of means, the operator needs to consider and recreate an operation NC program from scratch.

However, making such an operation NC program needs proficiency, resulting in the problem that long time is taken. Furthermore, a human-caused error may occur when the operation NC program is created again. As described above, reproduction of the same machining as the previously executed machining needs proficiency and high-level attentiveness. Furthermore, it is time-consuming to input an operation NC program character by character from a keyboard each time setup is performed. As a result, the burden on the operator is increased, and the productivity of machining workpiece is lowered.

The numerical control device of Patent Literature 1 stores one MDI program which is being edited, but does not store multiple MDI programs. Therefore, it is needed to again create an MDI program in order to perform the operation of the same content as that of the previously used MDI program that is different from the MDI program which is being edited.

The present invention has been made to overcome the aforementioned problem, and it is an object of the present invention to facilitate reuse of the previously executed operation NC program.

In order to achieve the aforementioned object, according to the present invention, a control apparatus for a machine tool for driving the machine tool by executing an NC program is provided, the control apparatus for a machine tool including first program storage part for storing a machining NC program by identifying a program name or a program number, second program storage part for storing the operation NC program each time an operation NC program which is manually input by an operator is executed, and a display part for displaying side by side multiple operation NC programs stored in the second program storage part.

By adopting this configuration, it becomes easy for the operator to reuse the previous operation NC program, which was input several times before. The operator does not need to store multiple operation NC programs, which are input manually. Alternatively, the need of creating the same operation NC program again is eliminated.

Furthermore, according to the present invention, a control apparatus for a machine tool is provided in which the display part includes a program list display part for displaying side by side multiple operation NC programs stored in the second program storage part, and an execution program display part for displaying an operation NC program to be executed, and displays an operation NC program on the execution program display part when the operation NC program is selected from a list displayed on the program list display part.

By adopting this configuration, the operator need not manually input an operation NC program again in reusing the previous operation NC program.

Furthermore, according to the present invention, a control apparatus for a machine tool is provided in which the second program storage part compares an operation NC program that is manually input and executed by the operator and an operation NC program stored in the second program storage part, and performs storing as one operation NC program when the operation NC programs have the same content.

By adopting this configuration, a redundant operation NC program is not buried in other operation NC programs, and the operator is able to find a needed operation NC program promptly.

Furthermore, according to the present invention, a control apparatus for a machine tool is provided in which the second program storage part stores the last execution date and time of each operation NC program and the display part displays operation NC programs in order of last execution date and time.

Furthermore, a control apparatus for a machine tool is provided in which the second program storage part stores the number of times that each operation NC program has been executed and the display part displays operation NC programs in order of the number of executions.

By adopting this configuration, among the operation NC programs, an operation NC program with low usage frequency such as a program in which last update date and time is old or a program that is used a small number of times is deleted, and an operation NC program with high use value remains. When a non-preferable operation NC program with low usage frequency is deleted, the operator is able to find an operation NC program with high usage frequency promptly.

According to the present invention, multiple operation NC programs are stored and displayed side by side. Therefore, when an operation NC program which is the same as the previous one is to be executed, the operator may make the same input without change while viewing the previous operation NC program. Thus, time for creating an operation NC program again is reduced and even an unskilled person is able to create an operation NC program, resulting in an increase in productivity. Furthermore, an operation NC program can be selected from the program list display part and inserted into the execution program display part without inputting the previous operation NC program character by character. Thus, the trouble of re-inputting an NC program and an input error are reduced, providing an effect of further increasing the productivity.

DETAILED DESCRIPTION OF THE INVENTION

In a numerical control-type machine tool, machining is performed on the basis of a machining NC program described with various commands such as relative movement of a tool with respect to a workpiece. The operator creates a machining NC program for performing machining of a workpiece on the basis of a desired workpiece shape by means of a CAM (Computer Aided Manufacturing) system, and inputs a file of the created machining NC program to a control apparatus for a machine tool via a storage medium such as a USB memory, or a network. Furthermore, the operator gives a command of a program number in order to specify a desired machining NC program and causes the machine tool to be operated automatically. The control apparatus for a machine tool reads the commanded machining NC program and drives the machine tool on the basis of the machining NC program.

The operator is needed to perform machining setup operations by operating a machine tool prior to machining according to not only the machining NC program, but also the states of a machine tool, a tool, or a workpiece to be used in practice. For example, a workpiece is placed on the machine tool or the interior of the machining chamber of the machine tool is cleaned. Furthermore, the location information of a workpiece coordinate system and the information of a tool used in the machining NC program is set. At this time, the operator uses an operation NC program in order to give commands to the machine tool, including the movement of a feed axis, coolant discharge operation, the operation of discharging cutting chips, a call of a measurement subprogram, and designation of the argument. The operator does not create an operation NC program with a CAM system each time, but considers and manually inputs an operation NC program in the MDI mode in each case while checking the state of the machine tool. In this way, the operator separately uses the machining NC program and the operation NC program accordingly and performs desired workpiece machining.

Figure 1:
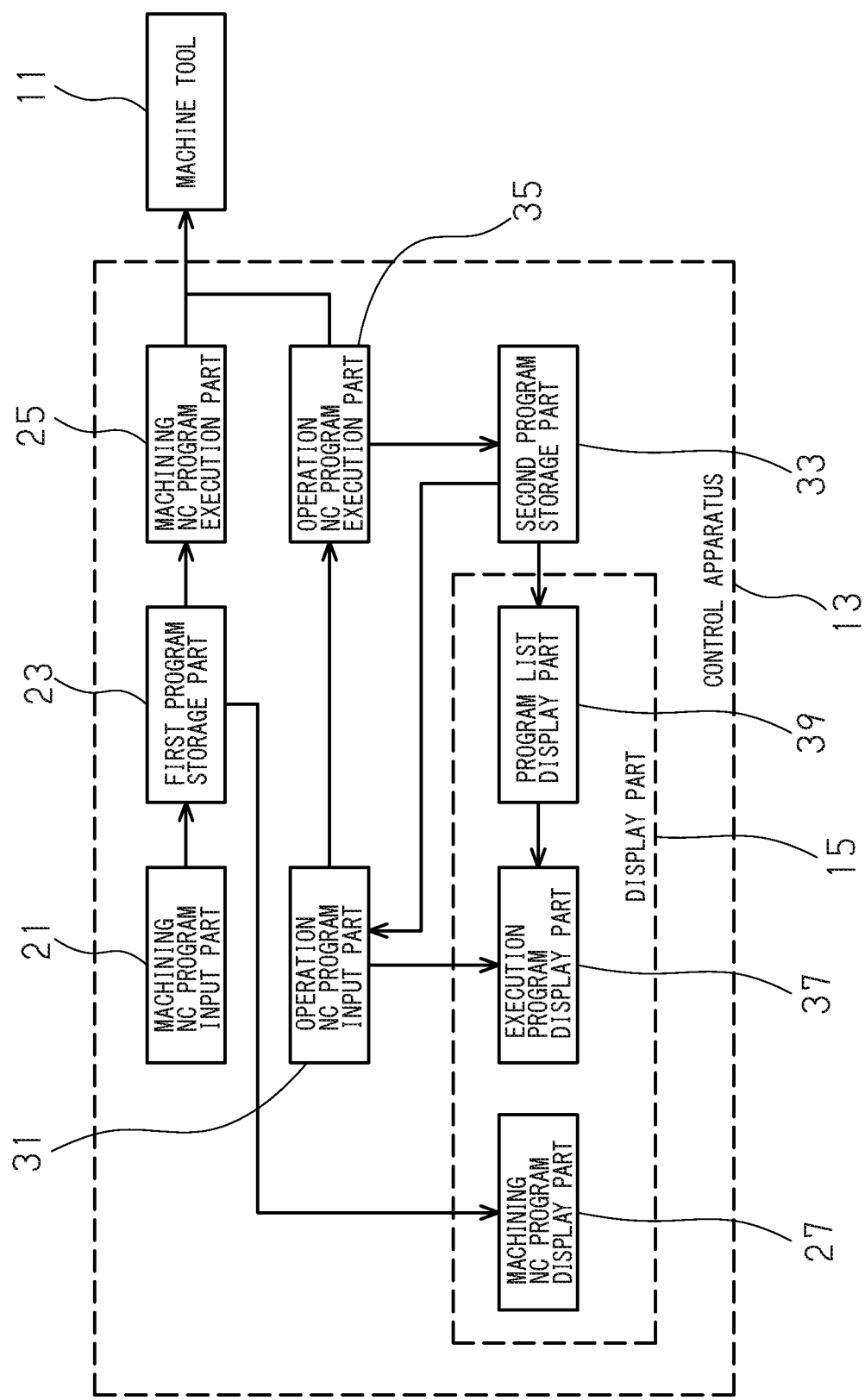
FIG. 1 is a block diagram of a control apparatus for a machine tool according an embodiment of the present invention.

In the following, a preferred embodiment of a control apparatus for a machine tool according to the present invention is described on the basis of the drawings. The flow of execution of a machining NC program is described with reference to FIG. 1. A control apparatus 13 of a machine tool 11 stores a machining NC program which is input from a machining NC program input part 21, in first program storage part 23 and displays the machining NC program on a display part 15. Furthermore, when the machining NC program receives an execution command, a machining NC program execution part 25 sends a command to the machine tool 11 on the basis of the machining NC program stored in the first program storage part 23, and the machine tool 11 is driven.

Figure 2:
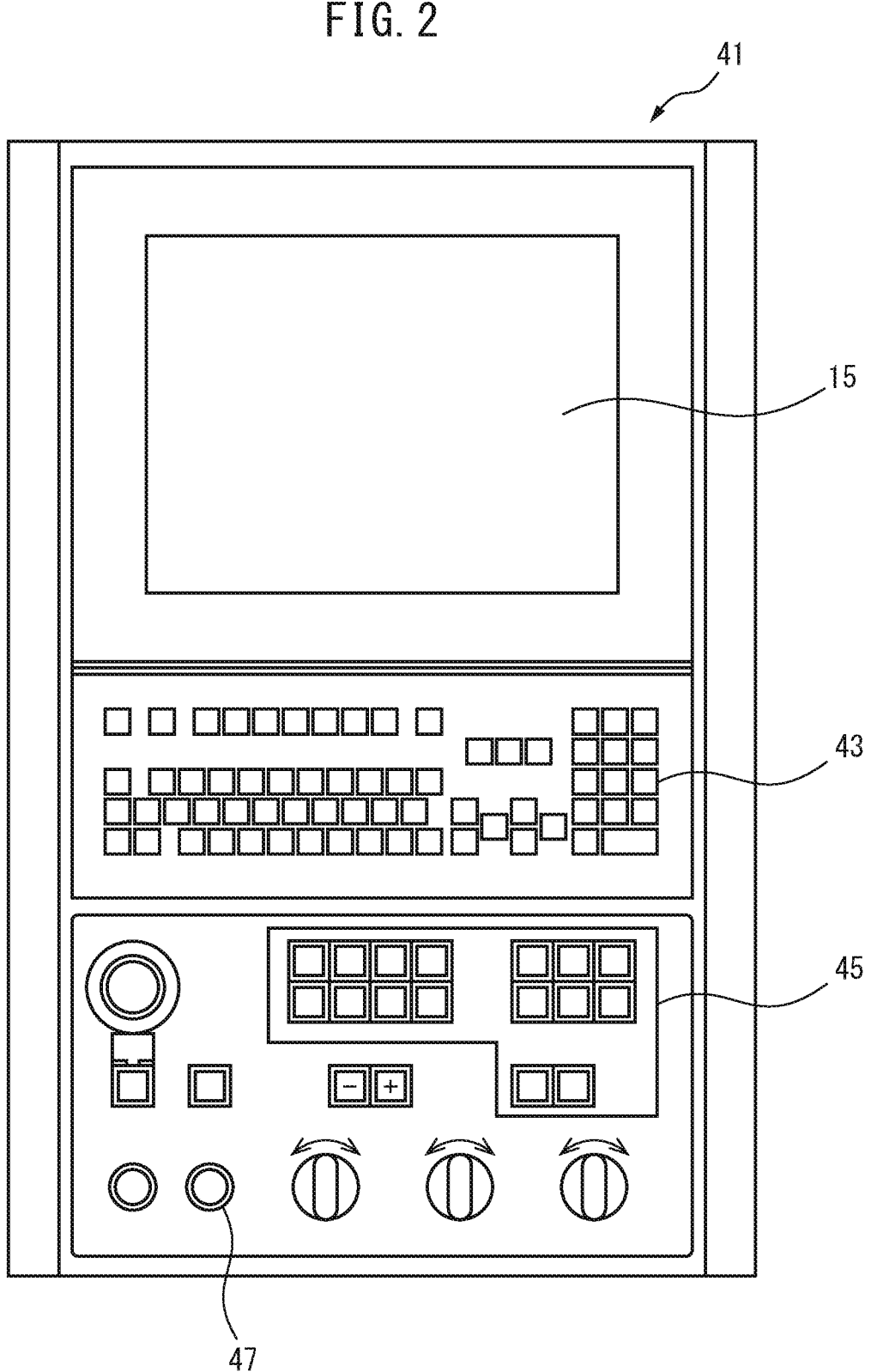
FIG. 2 is a schematic front view of an operation board for use in a control apparatus for a machine tool of the present invention.

An operation board 41 of the control apparatus 13 is described with reference to FIG. 2. The operation board 41 includes the display part 15, a keyboard 43 serving as an input device, and various switches 45. In the present embodiment, the display part 15 includes a touch panel-type screen, which also functions as an input device.

Figure 3:
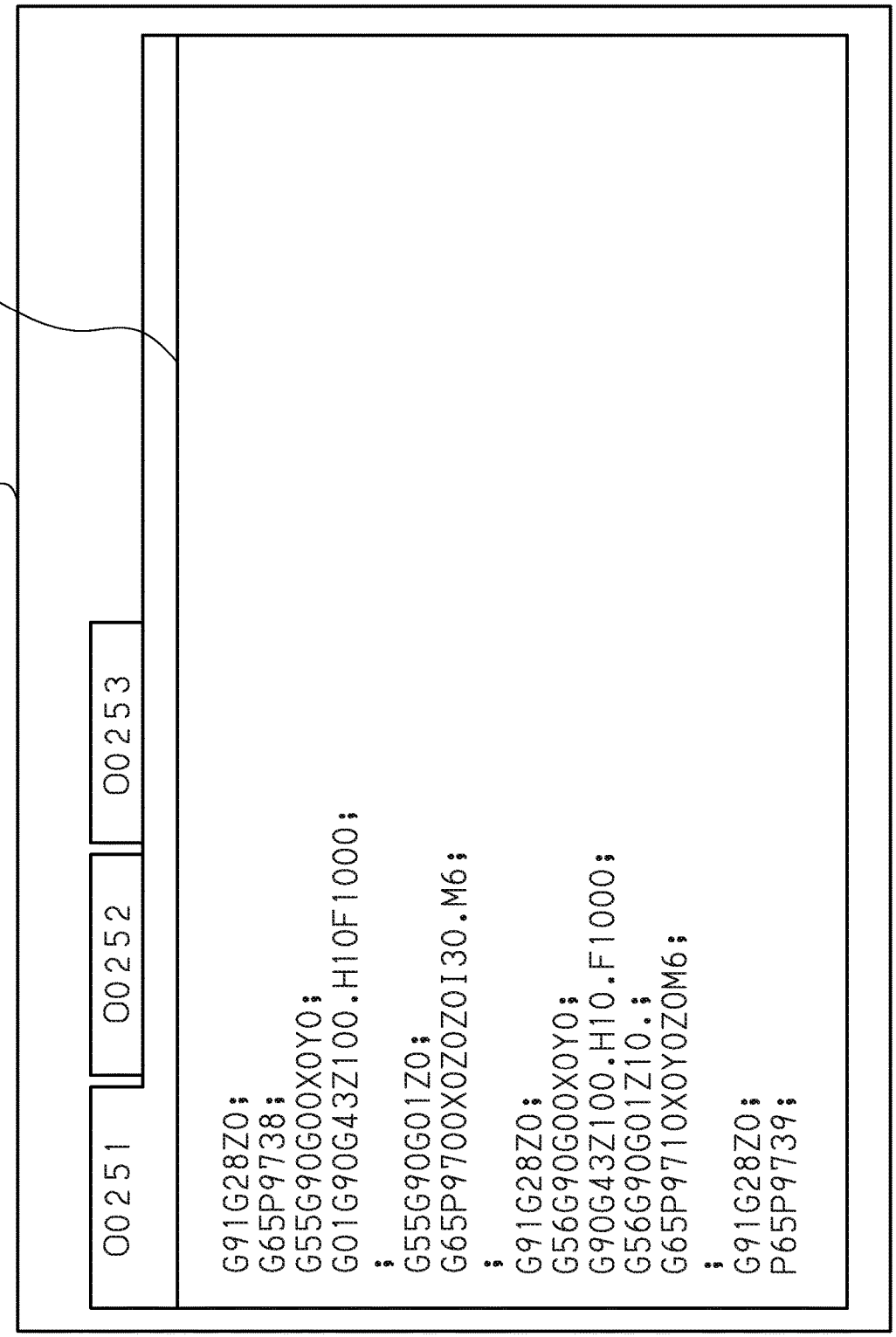
FIG. 3 is a schematic view of a display part for displaying a machining NC program.

The operator uses a storage medium such as a USB memory, or a network, and a machining NC program is input to the machining NC program input part 21 in a state of being associated with a program number or a program name. The machining NC program input is stored in the first program storage part 23 together with the program number or the program name. The operator selects a program number or a program name on the keyboard 43 and the touch panel-type screen. In FIG. 3, a machining NC program associated with the selected program number or program name is displayed on a machining NC program display part 27 of the display part 15. In FIG. 3, the machining NC program designated with program number 00251 is selected and the machining NC program is displayed on the screen. When the operator presses a cycle start button 47 with the machining NC program being selected, the machining NC program execution part 25 interprets the machining NC program and sends a command to the machine tool 11.

The flow of execution of an operation NC program is described by referring again to FIG. 1. The control apparatus 13 for the machine tool 11 displays an operation NC program input from an operation NC program input part 31 on the display part 15. Furthermore, when a command of execution of the operation NC program is received, the operation NC program is stored in the second program storage part 33, and simultaneously the operation NC program execution part 35 sends a command to the machine tool 11 on the basis of the operation NC program, so that the machine tool 11 is driven. The operation NC program stored in the second program storage part 33 is displayed on a program list display part 39.

The operator uses the operation NC program input part 31 such as the keyboard 43 and the touch panel-type screen, and inputs a machining NC program character by character. The display part 15 in FIG. 4 displays an execution program display part 37 and the program list display part 39. The execution program display part 37 displays characters input from the operation NC program input part 31. When the operator presses the cycle start button 47 after the full statement of an operation NC program to be executed is input, the operation NC program execution part 35 interprets the operation NC program, sends a command to the machine tool 11, and stores the operation NC program to be input in the second program storage part 33. The second program storage part 33 stores the operation NC program as well as the last execution time and the number of executions of the operation NC program. The operation NC program execution part 35, when causing the executed operation NC program to be stored, compares it with an operation NC program stored in the second program storage part 33. When it is determined that the operation NC programs are the same, the operation NC program execution part updates the last execution date and time and increases the number of executions. When it is determined whether the operation NC programs are the same, line feed codes in the operation NC programs are neglected.

The second program storage part 33 is configured, for example, with 20 cases as a maximum storage number. Among operation NC programs, 20 cases in descending order from the most recent last execution date and time are stored. When a 21st operation NC program is executed, the operation NC program whose last execution date and time is old is deleted, and the new operation NC program is stored. The program list display part 39 displays operation NC programs which are stored in the second program storage part 33 in order of last execution date and time. An operation NC program that may not be fully displayed due to limitations of the size of the display part 15 may be checked when the display is scrolled upward and downward with a scroll bar.

Figure 4:
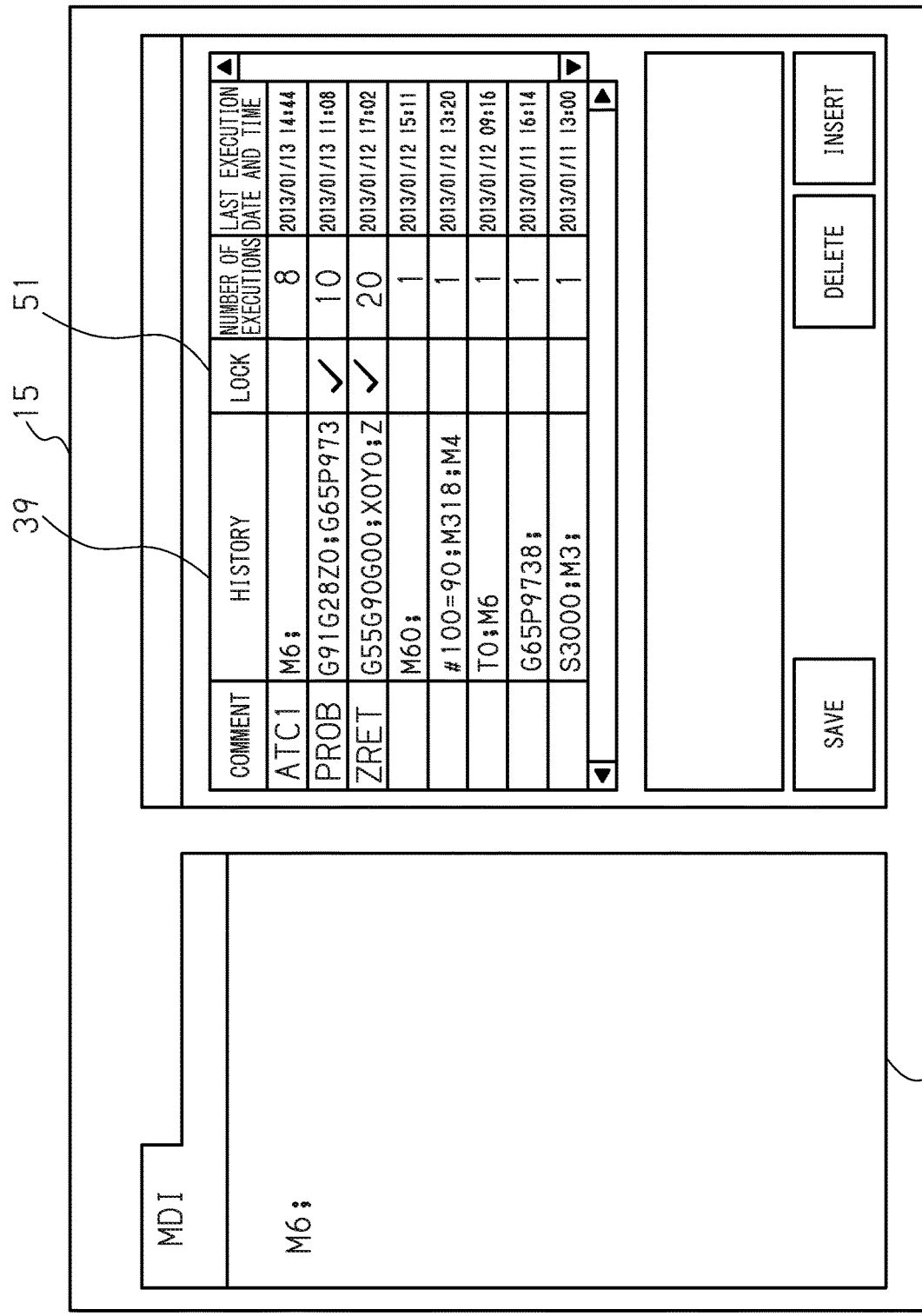
FIG. 4 is a schematic view of a display part at a time when an operation NC program is executed.

FIG. 4 indicates an example where the operator has input "M6;". The "M6;" is an NC program indicating tool change. Therefore, when the operator presses the cycle start button 47, the machine tool 11 performs tool change. In this case, "M6;" is already stored in the second program storage part 33. Therefore, in the row of "M6;" of the program list display part 39, the number of executions is increased by one and becomes eight, the last execution date and time is updated, and furthermore the row of "M6;" is moved to the top of the program list.

Furthermore, the second program storage part 33 is also capable of storing programs in descending order of the number of executions. In this case, when a 21st operation NC program is executed, the operation NC program whose number of executions is small is deleted. When the numbers of executions are the same, a program whose last execution date and time is old is deleted.

Among the operation NC programs, a program whose last update date and time is old or a program used a small number of times is unlikely to be reused. By deleting the program whose last update date and time is old or the program used a small number of times, an operation NC program needed is prevented from being buried in a number of unpreferable operation NC programs. Furthermore, determining and collectively storing the same NC programs lead to a reduction in an unpreferable operation NC programs.

When unpreferable operation NC programs are reduced, the operator is able to find a needed operation NC program promptly.

Exceptionally, when the operator determines to save the program whose last update date and time is old or the program used a small number of times among the operation NC programs, a check mark may be displayed when a lock column 51 is tapped, enabling locking. A locked operation NC program is not deleted even if the last execution date and time of the program is the oldest or the number of executions of the program is the smallest. Instead, among the unlocked operation NC programs, one which is the oldest or whose number of executions is small is deleted. This is effective when an operation NC program that is less frequently used but is assuredly used at a later date is stored.

Next, a method of reusing an operation NC program is described. The operator may easily remember that the operation NC program for tool change is "M6;" by looking at the storage of the program list display part 39 even if the operator does not memorize the instruction word of an NC program. The operator who has remembered that the operation NC program for tool change is "M6;" may perform execution by again inputting the operation NC program via the operation NC program input part 31 such as the keyboard 43 or the touch panel-type screen, while looking at the program list display part 39.

Furthermore, the operator may leave a comment in the comment box of the program list display part 39 when feeling the necessity. The "ATC1" is entered in the comment box of "M6;", so that the operation NC program for tool change can be easily identified.

Figure 5:
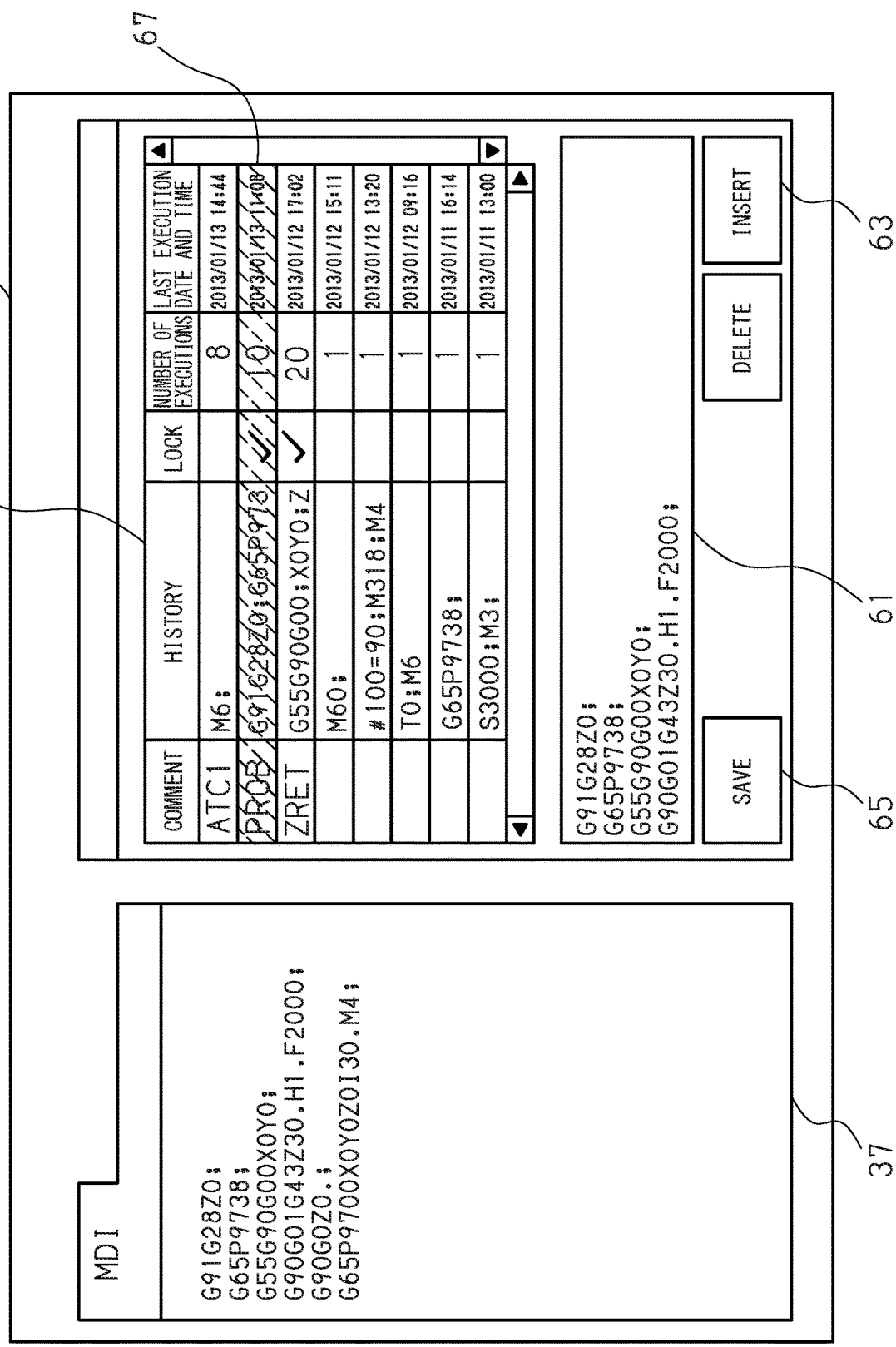
FIG. 5 is a schematic view of a display part at a time when an operation NC program is selected.

By referring to FIG. 5, when an operation NC program is so long that it may not fit in the box of the program list display part 39 such as "G91G28Z0; G65P9738; G55G90G00 . . . ", by selecting the row of an operation NC program to be reused, the operation NC program may be input while the portion cut off from the box of the program list display part 39 is looked at on a preview 61. In FIG. 5, a row 67 indicated by hatching is selected. When an insertion button 63 is pressed with the row 67 of an operation NC program to be reused being selected, the selected operation NC program is inserted into the execution program display part 37. When a save button 65 is pressed, the operation NC program having the selected row may also be saved as a text file in a different place of the storage device. Furthermore, when a desired portion of a machining NC program is specified and a machining NC program insertion button which is not illustrated is pressed while a machining NC program is being edited, an operation NC program list is displayed. When an operation NC program to be inserted is selected, a desired operation NC program may be inserted in a specified portion of the machining NC program.

REFERENCE SIGNS LIST

11 Machine tool
13 Control apparatus
15 Display part
21 Machining NC program input part
23 First program storage part
25 Machining NC program execution part
27 Machining NC program display part
31 Operation NC program input part
33 Second program storage part
35 Operation NC program execution part
37 Execution program display part
39 Program list display part
41 Operation board

The invention claimed is:

1. A control apparatus for a machine tool for driving the machine tool by executing an NC program, the control apparatus for the machine tool comprising:
   a first program storage part for storing a an auto-input NC program by adding a program name or program number to the auto-input NC program in an automatic operation mode;
   a second program storage part for storing a manual-input NC program when the manual-input NC program, manually input character by character by an operator in an MDI (manual data input) mode, is executed; and
   a display part for displaying the program name or program number of the auto-input NC program stored in the first program storage part so that the program name or program number can be selected in the automatic operation mode, and for displaying side by side a plurality of manual-input NC programs stored in the second program storage part to be selected in the MDI mode,
   wherein the second program storage part is configured to compare a new manual-input NC program that is manually input and executed by the operator to an old manual-input NC programs previously stored in the second program storage part, and is configured to, when the compared manual-input NC programs have the same content, store the same manual-input NC programs as one manual-input NC program, and the control apparatus is configured to drive the machine tool by executing the auto-input NC program having the selected program name or program number in the automatic operation mode, and to drive the machine tool by executing the manual-input NC program selected from the manual-input NC programs displayed on the display part in the MDI mode.

2. The control apparatus for the machine tool according to claim 1, wherein the display part includes a program list display part for displaying side by side the plurality of manual-input NC programs stored in the second program storage part and an execution program display part for displaying an manual-input NC program to be executed, and displays the manual-input NC program on the execution program display part when the manual-input NC program is selected from a list displayed on the program list display part.

3. The control apparatus for the machine tool according to claim 1, wherein the second program storage part stores last execution date and time of each of the manual-input NC programs and the display part displays the manual-input NC programs in order of the last execution date and time.

4. The control apparatus for the machine tool according to claim 1, wherein the second program storage part stores the number of times that each of the manual-input NC programs is executed and the display part displays the manual-input NC programs in order of the number of executions.

* * * * *